Dec. 30, 1941.  L. W. BLAU  2,268,106
RADIO WAVE PROSPECTING
Filed May 13, 1939  3 Sheets—Sheet 2
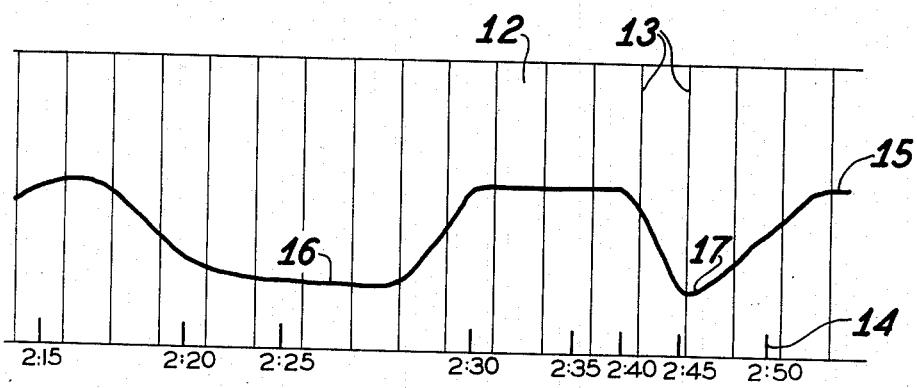
FIG_4_
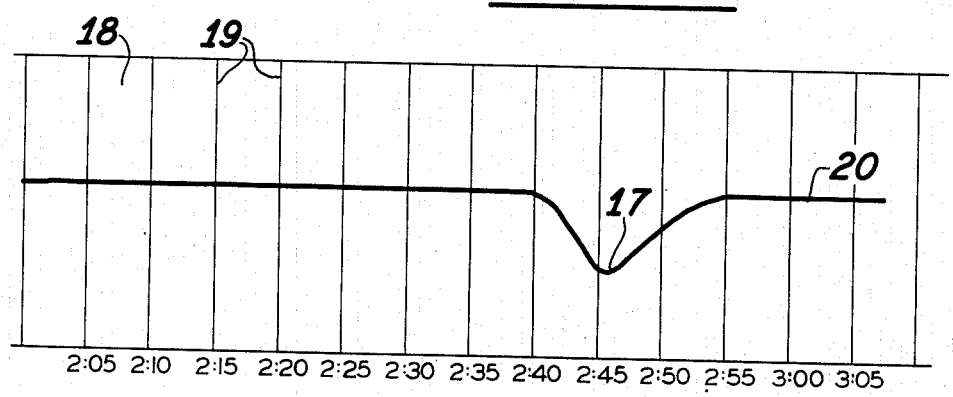
FIG_5_
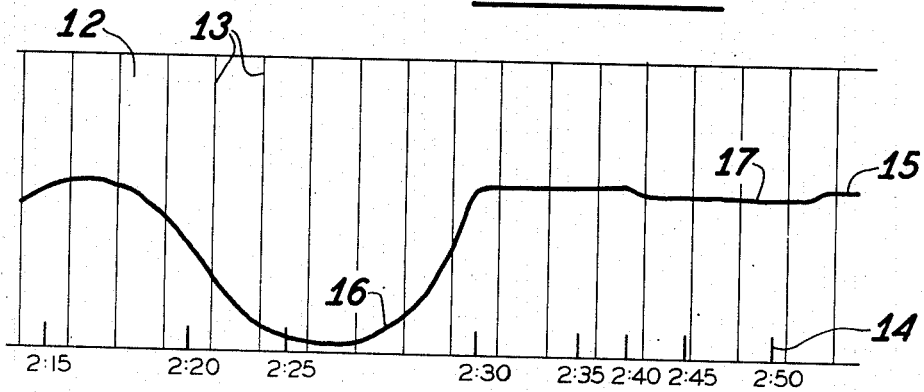
FIG_6_
INVENTOR.
Ludwig W. Blau
BY
P. L. Young  ATTORNEY.

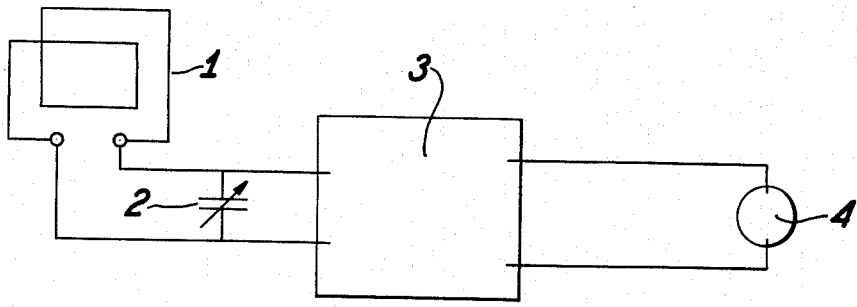
FIG_1_
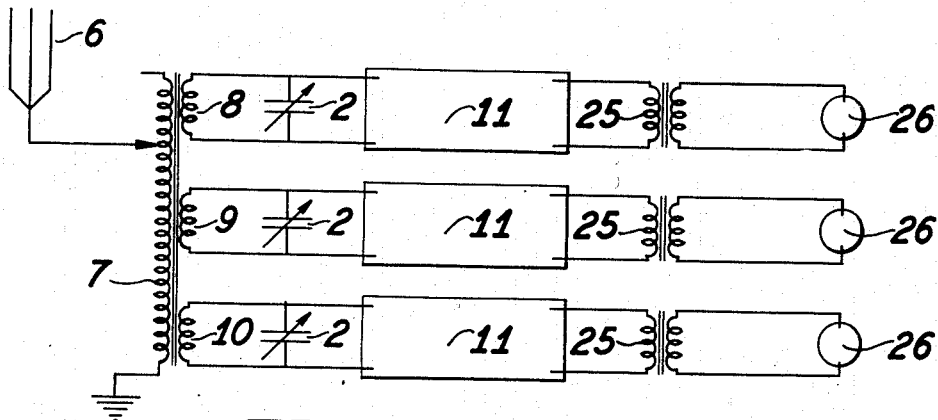
FIG_2_
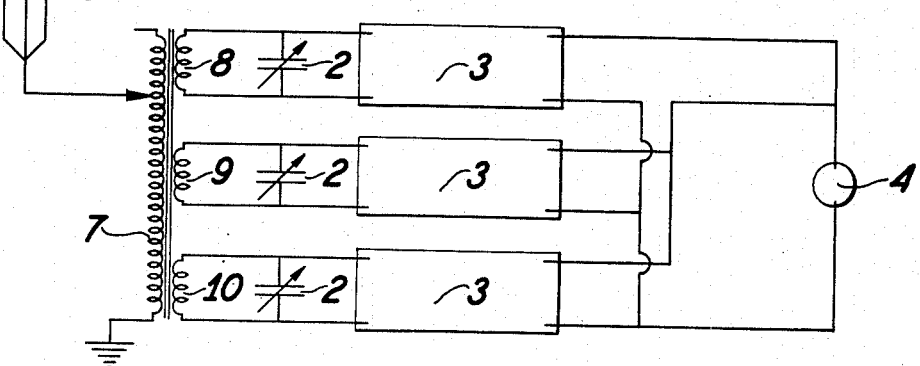
FIG_3_

Dec. 30, 1941.   L. W. BLAU   2,268,106
RADIO WAVE PROSPECTING
Filed May 13, 1939   3 Sheets-Sheet 3
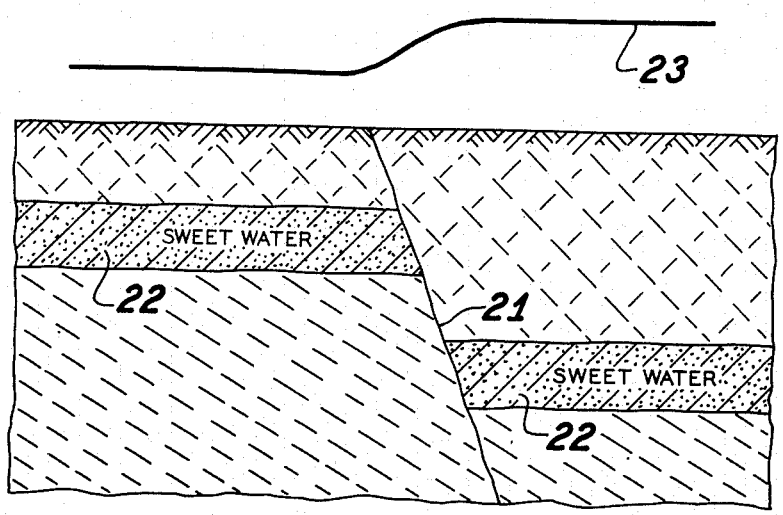
FIG_7_
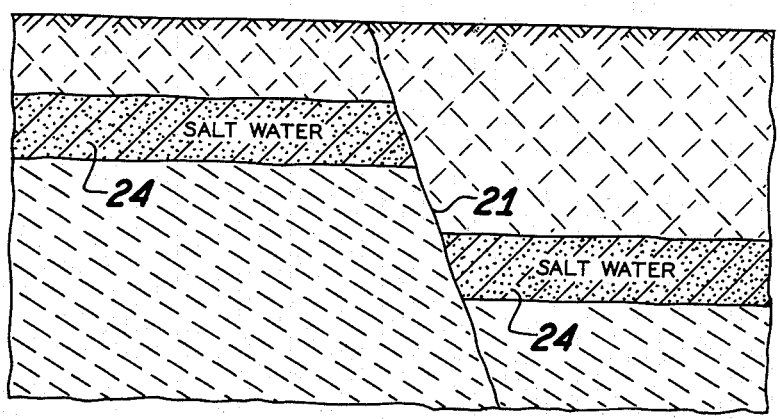
FIG_8_
INVENTOR.
Ludwig W. Blau
BY
P. L. Young
ATTORNEY.

Patented Dec. 30, 1941

2,268,106

UNITED STATES PATENT OFFICE 2,268,106

RADIO WAVE PROSPECTING

Ludwig W. Blau, Houston, Tex., assignor to Standard Oil Development Company, a corporation of Delaware Application May 13, 1939, Serial No. 273,458

4 Claims. (Cl. 175—182)

The present invention is directed to a method of prospecting for subterranean deposits, including minerals of various kinds and anomalous structures which might be conducive to the accumulation of oil. It is particularly adapted to the location of faults and similar subsurface anomalies.

The method of the present invention utilizes radio waves or electromagnetic waves of radio frequencies. One of its particular advantages is that commercial broadcasting stations can be used as the sources of the waves which are utilized. Thus, the prospecting method of the present invention requires only the use of receiving and recording equipment.

As is known, each radio station has its own particular broadcasting wave of a specific frequency. The field strength of the waves transmitted by these stations varies from place to place depending upon several conditions, among which may be mentioned the terrain, objects on the terrain, such as trees, telegraph lines, railroad lines, etc., and the geological structure beneath the surface. Measurements of the field strength of these waves alone would provide very unreliable data because, due to the various influencing factors, it would not be possible to decide with certainty to what a change in field strength might be due. A most important factor in this respect is a change in power of the broadcasting station.

According to the present invention, measurements of the field strength of radio waves are utilized for sources of information concerning subsurface geology by resorting to an expedient to eliminate from the record of the field strength those changes which are not due to subsurface anomalies. According to one embodiment of this invention, the expedient employed is the setting up of a base station where a wave of selected frequency is received and recorded simultaneously with the reception and recording of the same wave at various points over an area to be investigated. In this way, errors arising out of changes in power at the broadcasting station are completely eliminated.

In another embodiment of the present invention, advantage is taken of the fact that waves of some frequencies are little affected by trees and similar obstructions, whereas waves of all frequencies are affected by changes in subsurface geology. In this embodiment, waves of different, preferably widely different, frequencies are simultaneously received and their field strengths measured and recorded at selected points in an area under investigation. For example, waves of 50 and 600 meters may be employed. Generally, however, waves of different wave lengths between 200 and 600 meters give satisfactory results. Usually, two waves of widely different frequencies provide the necessary check upon each other, but the ironing out of variations due to causes other than subsurface anomalies is increased by utilizing a large number of waves of different frequencies. These waves may be picked up by the same antenna, then isolated from each other and separately amplified and recorded separately or as a composite.

It is advantageous to combine these two expedients. Thus, where two waves of different frequencies are being recorded, it is conceivable, though not to be expected as a common occurrence, that there might be a simultaneous decrease in power output at the two stations from which the waves are received. In this event the record obtained at the base station would make it possible to attribute to the correct cause any misleading aberrations in the field record.

In the practice of the present invention, a radio receiver is mounted on an automobile or other suitable vehicle provided with an antenna. When directional antennae are employed, it is preferable to employ two of them at right angles, each being connected to its own receiving and recording unit. With a non-directional antenna, however, one receiver and recorder are sufficient, unless it is desired to isolate a plurality of waves of different frequencies, in which case there are a detector and amplifier for each separate wave. The desired wave length to be observed is selected from the waves picked up by the antenna by a suitable tuning condenser and is fed to a detecting and amplifying unit the output of which is connected to a galvanometer which records on a moving sensitized strip actuated by the front wheels of the vehicle, or in any other manner similar to a milometer, and provided with distance marks. Means is also provided for recording simultaneously on the strip suitable time marks. It may be mentioned here that the detector need not be employed, but is preferably used because more sensitive instruments for recording direct current changes than for recording currents of radio frequency are available.

When a base station is employed, a similar moving recording strip is utilized and on it are recorded, in addition to the changes in field strength of the wave being utilized, time marks identical with those recorded on the moving strip in the field apparatus. The preferred procedure is to start both time recording apparatus going as the field apparatus leaves the base station. The car or vehicle is driven over the area under investigation along selected lines so arranged as to give sufficient information to draw a profile map of the subsurface based on the information recorded. In order that the operator may be apprised of interesting points, while traveling over the area under investigation, it is convenient to arrange meters on the dash board of the vehicle in a position where they may be observed by the operator so that he will be able to recognize the occurrence of distinct anomalies.

The present invention may be better understood from the following detailed description of the accompanying drawings in which Fig. 1 is a schematic view of one type of receiving apparatus, Fig. 2 is a similar view of an alternative type of a receiving apparatus, Fig. 3 is a similar view of still another embodiment of receiving apparatus, Fig. 4 is a replica of a record obtainable by simply measuring the field strength of a wave of a given frequency over a given area, Fig. 5 is a similar record of the same wave covering the same period of time secured at a base station, Fig. 6 is a replica of a field record obtainable by recording variations in field strengths of two waves of different frequencies as a single trace, Fig. 7 is a graphical illustration of the type of record which may be expected over one type of fault, while Fig. 8 is a graphical illustration of the type of record which may be expected over a different fault.

As previously stated, the receiving apparatus for the practice of the present invention consists essentially of an antenna, tuning means, amplifying means and recording means.

In Fig. 1, numeral 1 designates an antenna, numeral 2 designates a tuning condenser which filters out all waves except that which is desired to be inspected, which is conducted to a conventional detector and amplifier 3, the output of which is connected to a recording galvanometer 4. It will be understood that the recording galvanometer is arranged in working relation with a sensitized film driven at a speed proportional to the speed of the vehicle. As this recording apparatus is conventional with many types of apparatus in this art of prospecting, a specific description of it is omitted for the sake of clarity.

In the apparatus shown in Fig. 2, the energy picked up by the antenna 6 is passed through one winding 7 of a transformer, the other winding of which is divided into as many parts as waves to be inspected are desired. In the particular embodiment shown, the secondary is divided into three parts 8, 9 and 10, each being provided with its own tuning condenser 2 and its own amplifier 11. In this embodiment, the output of each amplifier is fed through a transformer to a separate recording oscillograph 26, so that the record produced will have three traces.

The embodiment shown in Fig. 3 differs from that shown in Fig. 2 in that a detector and amplifier 3 is employed as in Fig. 1 and the outputs of all the transformers are combined and fed to the recording galvanometer 4. In this case, the record has only a single trace.

Referring to Fig. 4, the record is a strip 12 of sensitized paper which is provided with transverse lines 13 which indicate distance. The space between these lines may conveniently represent a tenth of a mile. The record is also provided with time marks 14 which are recorded simultaneously with the trace 15 which represents the field strength of the wave being studied. It will be noted that the trace has a pronounced dip 16 and another pronounced dip 17. Ordinarily, a person studying this record would be unable to tell whether or not either or both of these dips indicate changes in subsurface structure.

A reference to the base station record is shown in Fig. 5 which is also a strip 18 of sensitized paper provided with time lines 19 and a trace 20 shows that the dip 17 was due to the change in the power output of the broadcasting station.

Referring to Fig. 6 which, as previously pointed out, is a composite record of the field strength of two waves of different wave lengths, in this case 200 and 400 meters, respectively, it can be seen that the dip 17 of the record shown in Fig. 4 is largely ironed out, while the dip 16 is somewhat emphasized.

It appears that the greater the resistance of the substrata, the less will be the field strength of the radio wave. This is illustrated in Fig. 7 in which is shown a fault 21 passing through a sweet water sand 22. To the left of the fault, the sweet water sand is closer to the surface. Above the surface is shown a line 23 designating the field strength of the radio wave which, as can be seen, is lower to the left of the fault than to the right of the fault. Conversely, as shown in Fig. 8, with a salt water sand 24, the field strength is greater to the left of the fault than to the right of the fault.

It will be understood that the practice of the present invention does not require the actual recording of a trace indicative of field strength. The same results can be obtained by reading meters at selected points and noting the numerical values of the field strengths. From these values can be derived curves similar to the traces obtained with recording galvanometers.

The nature and objects of the present invention having been thus described and illustrated, what is new and useful and is desired to be secured by Letters Patent is:

1. A method for determining the subsurface structure of the earth over a given area which comprises moving over said area an antenna whereby radio waves passing over the area are picked up, selecting from the picked up waves a plurality of waves different and definite in frequencies and produced by separate transmitting stations, separately amplifying and recording the variations in field strength of the waves so selected, and comparing the records so obtained.

2. A method for determining the subsurface structure of the earth over a given area which comprises moving over said area in selected paths an antenna, whereby radio waves passing over said area are picked up, selecting from the picked up waves at least two waves having widely different wave lengths and produced by separate transmitting stations, and separately amplifying and recording the variations in field strength of the selected waves.

3. A method for determining the subsurface structure of the earth over a given area which comprises moving an antenna over said area, whereby radio waves passing over said area are picked up, selecting from said picked up waves a plurality of waves of different definite wave lengths and produced by separate transmitting stations, separately amplifying the selected waves combining the waves so amplified, and recording the variations in field strength of the combined waves.

4. A method for determining the subsurface structure of the earth over a given area which comprises establishing a radio receiving base station, moving an antenna over the area under investigation, whereby radio waves passing over said area are picked up, selecting a plurality of waves of different definite frequencies and produced by separate transmitting stations from said picked up waves, separately receiving a plurality of waves of the same frequencies produced by the same transmitting stations at the base station, recording the variations in the field strength of the selected waves picked up by the moving antenna, simultaneously recording the variations in the field strength in the said waves at the base station, and comparing the records so obtained.

LUDWIG W. BLAU.